United States Patent [19]
Eder et al.

[11] Patent Number: 6,042,764
[45] Date of Patent: Mar. 28, 2000

[54] METHOD OF PRODUCING SHAPED PLASTIC FOAM PARTS

[75] Inventors: Bernhard Eder, Linz; Franz Reitinger, Rottenegg, both of Austria; Hans-Michael Sulzbach, Königswinter/Vinxel; Horst Klahre, Sankt Augustin, both of Germany

[73] Assignee: C.A. Greiner & Söhne Gesellschaft m.b.H., Kremsmünster, Australia

[21] Appl. No.: 09/207,964

[22] Filed: Dec. 9, 1998

Related U.S. Application Data

[62] Division of application No. 08/874,059, Jun. 12, 1997, Pat. No. 5,885,693, which is a continuation of application No. 08/346,501, Nov. 29, 1994, abandoned.

[30] Foreign Application Priority Data

Nov. 29, 1993 [AT] Austria ................................... 2416/93
Aug. 10, 1994 [AT] Austria ................................... 1556/94

[51] Int. Cl.[7] ........................... B29C 44/04; B29C 44/06; B29C 44/12
[52] U.S. Cl. ..................... 264/45.3; 264/122; 264/271.1; 264/278; 264/321; 264/46.7; 264/916
[58] Field of Search ..................................... 264/321, 122, 264/45.3, 278, 45.1, 46.7, 271.1, 916, 123

[56] References Cited

U.S. PATENT DOCUMENTS

| | | | |
|---|---|---|---|
| 3,878,133 | 4/1975 | Rubens | 428/313.5 |
| 3,950,471 | 4/1976 | Stastny et al. | 264/122 |
| 4,243,625 | 1/1981 | Burge | 264/122 |
| 4,250,136 | 2/1981 | Rex | 264/321 |
| 4,303,602 | 12/1981 | Lichter et al. | 264/122 |
| 4,307,200 | 12/1981 | Lichter et al. | 264/122 |
| 4,666,646 | 5/1987 | Chang | 264/109 |
| 4,874,648 | 10/1989 | Hill et al. | 428/35.9 |
| 5,055,339 | 10/1991 | Eder et al. | 264/45.3 |
| 5,135,959 | 8/1992 | Hill | 521/54 |
| 5,252,270 | 10/1993 | Haardt et al. | 264/45.4 |
| 5,422,385 | 6/1995 | Farkas | 523/211 |
| 5,432,204 | 7/1995 | Farkas | 521/49 |

*Primary Examiner*—Allan R. Kuhns
*Attorney, Agent, or Firm*—Collard & Roe, P.C.

[57] ABSTRACT

A method of producing a three-dimensional shaped plastic foam part comprises the steps of mixing plastic foam granules of a predetermined range of sizes and of different hardness in a predetermined mixing ratio to obtain a mixture of the plastic foam granules, mixing the mixture of the plastic foam granules with a liquid primary material until the granules are coated with the liquid primary material and a mixture of coated plastic foam granules is obtained, feeding a preset quantity of the mixture of coated plastic foam granules into a mold cavity of a mold closed on all sides, reducing the volume of the mold cavity at least in partial regions thereof after it has been filled with the mixture of coated plastic foam granules, triggering a reaction of the liquid primary material by applying pressure and heat until a continuous cellular structure of plastic foam has been formed and the plastic foam granules have been interconnected by the cellular structure of plastic foam after the volume of the mold cavity has been reduced at least in partial regions thereof, ventilating gaseous reaction media from the mold cavity through openings in the sides of the mold, and removing the three-dimensional shaped part from the mold cavity.

12 Claims, 5 Drawing Sheets

METHOD OF PRODUCING SHAPED PLASTIC FOAM PARTS

CROSS REFERENCE TO RELATED APPLICATIONS

This is a divisional application of Ser. No. 08/874,059, filed Jun. 12, 1997, now U.S. Pat. No. 5,885,693, which is a continuation of application Ser. No. 08/346,501, filed Nov. 29, 1994, now abandoned.

BACKGROUND OF THE INVENTION

1. Field of the Invention

The present invention relates to a method of producing a shaped part of plastic foam granules interconnected by a cell structure of a plastic foam of primary material, in particular soft plastic foam, if required, with at least one covering layer arranged on a surface.

2. The Prior Art

Pursuant to EP-A1-0 350 807, the production of shaped parts from foamed plastic plates is already known. These foamed plastic plates consist of foamed plastic granulates of a soft foamed plastic having a grain size of between 2 mms and 20 mms, and additional filling material such as cork granulates, rubber granulates, chalk, calcium carbonate, hard polyurethane waste or thermoplastic waste plastics having a grain size of between 2 mms and 20 mms, which are foamed in dispersed form into foamed plastics made of primary material. To produce a shaped part from such a foamed plastic plate, the cellular webs and cellular walls of the plastic foam between the individual granules of the foamed plastic granulates and/or the filling material, and of course also the cellular webs and the cellular walls of foamed plastic granulates and, if necessary, the filling material, are plastically deformed in a permanent way. The deformation of the foamed plastic plates into these shaped parts occurs through the action of heat and pressure on the foamed plastic plates, which are produced by cutting up the foamed plastic block after it has been manufactured. In such shaped parts it is difficult to set the density or specific gravities in the individual areas of such a shaped part to desired values.

SUMMARY OF THE INVENTION

It is the object of the present invention to provide a method of producing create a shaped part which allows for various different three-dimensional embodiments and a deliberate universal adaptation of the density ratios in the individual cross-sectional areas of the shaped part.

This object is accomplished according to this invention by mixing plastic foam granules of a predetermined range of sizes and of different hardness in a predetermined mixing ratio to obtain a mixture of the plastic foam granules, mixing the mixture of the plastic foam granules with a liquid primary material until the granules are coated with the liquid primary material and a mixture of coated plastic foam granules is obtained, feeding a preset quantity of the mixture of coated plastic foam granules into a mold cavity of a mold closed on all sides, reducing the volume of the mold cavity at least in partial regions thereof after it has been filled with the mixture of coated plastic foam granules, triggering a reaction of the liquid primary material by applying pressure and heat until a continuous cellular structure of plastic foam has been formed and the plastic foam granules have been interconnected by the cellular structure of plastic foam after the volume of the mold cavity has been reduced in partial regions thereof, ventilating gaseous reaction media from the mold cavity through openings in the sides of the mold, and removing a three-dimensional shaped part from the mold cavity. This method is advantageous because when the material for the production of the shaped part, in particular granules of different plastics or filling materials, is introduced into a closed cavity, it leads to an evenly compressed filling due to the introduction by an air stream and thereby to a tight uniform embedding of the materials which are introduced approximately by floating within the air stream. Thereby, the shaped parts have a uniform density over their entire cross-sectional area. Thus, it is also possible to fill mold cavities with different spatial designs or different thicknesses, widths or lengths with an identical quantity of granules or filling materials having an approximately identical density . Thereby, shaped parts with properties, such as noise damping properties or strengthening values, which are approximately identical over their entire cross-section, can be achieved. This was not always possible up until now when granules and filling materials were placed or poured into an open mold because it led to an uneven displacement of granules mass and filling materials.

The method however, can also be realized by processing steps wherein the mixture quantity from the intermediate storage tank given to the weighing device, is between 3 and 15%, preferably between 5% and 10% above the quantity, which is to be filled into the mold for the production of the shaped part and that by means of the control by the weighing device, a mixed quantity which corresponds exactly to the filling weight is transferred with the conveyer to the conveyer, wherein it is possible to produce shaped parts having a density which is kept within strict limits.

By features wherein the volume of the mold cavity after it has been filled with granules and/or filling material, is reduced in the partial regions of the mold cavity and wherein the reaction of the raw material is triggered thereafter, it is further possible without subsequent thermal deformation or other pressure or heat treatment to produce shaped parts, which, seen across their cross-section are produced from the same base material with differently tight or strong areas. Thereby, also at densities which cannot be achieved anymore when blowing in the granules and filling materials during introduction, by compressing loose or non-connected granules or filling materials, a higher specific gravity can be achieved, if required, also over the entire three-dimensional shape of the shaped part, and there is virtually no effect on the connecting structure of the granules and filling material in a disadvantageous manner since the construction of the cell structure holding the individual granules and filling materials together, or connecting them to one another, is only occurring during the final phase of the compressed form. Thus, by applying such a method it is possible to produce shaped parts with this type of granules which are tightly linked and which can be more stressed.

By proceeding in a way whereby a volume of a mold cavity for a higher compacted region of a shaped element is larger than for a region having a lower density, the density of the specific gravity or the strength of individual areas of the shaped part can only be determined in a simple way by an increase in volume when the granules or filling materials are introduced. Thus it is possible by arranging a plurality of displaceable mold surfaces within the mold cavity to produce rapidly and easily, differently formed shaped parts.

Conveyance within an air stream wherein the mixture of granules and filling materials, is brought into the mold cavity by a conveying blower allows for an evenly tight filling of the mold cavity with granules or filling materials.

In a process wherein granules or filling materials taken from the receptacles if required, are supplied to the weighing tank after appropriate size reduction and according to the desired mixing ratio, an appropriate quantity of different flocks is taken from the receptacles, whereupon this mixture of granules and/or filling materials is conveyed to a mixing device in which it is mixed with liquid and/or pulverulent raw material in receiving tank and thereafter a predetermined quantity of granules and/or filling materials is supplied, in particular by a control system to an intermediate storage tank, whereby the predosed quantity of granules and/or filling material is transported by a conveyer to a receiving hopper or an inlet of a conveying blower and is blown by means of the latter into the mold cavity, it is advantageous that any composition of granules and filling materials can be achieved in a simple way and that due to an exact determination of the quantity to be filled with respect to the mold cavity, a uniform thickness and/or density can be achieved as desired during the filling process.

By a method wherein the gas used for the conveying blower to transport the granules and/or the filling materials, in particular air, is led out through ventilation openings in the mold surfaces of the mold, it is advantageous that an appropriate flow-away velocity of the gas or the air, which is used to transport the filling materials, can be simply preset and thereby also the degree of filling or the state of floating, in which the granules or filling materials are held in the gas or air.

By a method wherein the mold cavity has been filled through these ventilation openings the reaction means, in particular, vapour is supplied in order to cure the raw material, the blocking of the ventilation openings during the reaction process is prevented, which, if required, are also filled with parts of the raw material during the filling process, whereby an immediate self-cleaning of the ventilation opening sets in.

To proceed in a manner wherein before the granules (10, 11) and/or the filling material is introduced into the mold cavity (28) in the region of the mold surfaces (33 to 36 and 46) or the mold cavity (28), reinforcement elements are inserted and positioned and that after the flocks (10, 11) or shaped parts (2), however, before the complete reaction of the raw material (16, 17), the holding parts of the reinforcement elements are removed from the mold cavity (28) is also advantageous since maintenance and production costs of the shaped part can be kept at a minimum.

BRIEF DESCRIPTION OF THE DRAWINGS

Hereinafter, the invention will be explained in further detail, by way of example only, of the accompanying drawings, in which.

DETAILED DESCRIPTION OF PREFERRED EMBODIMENTS

Figure 1:
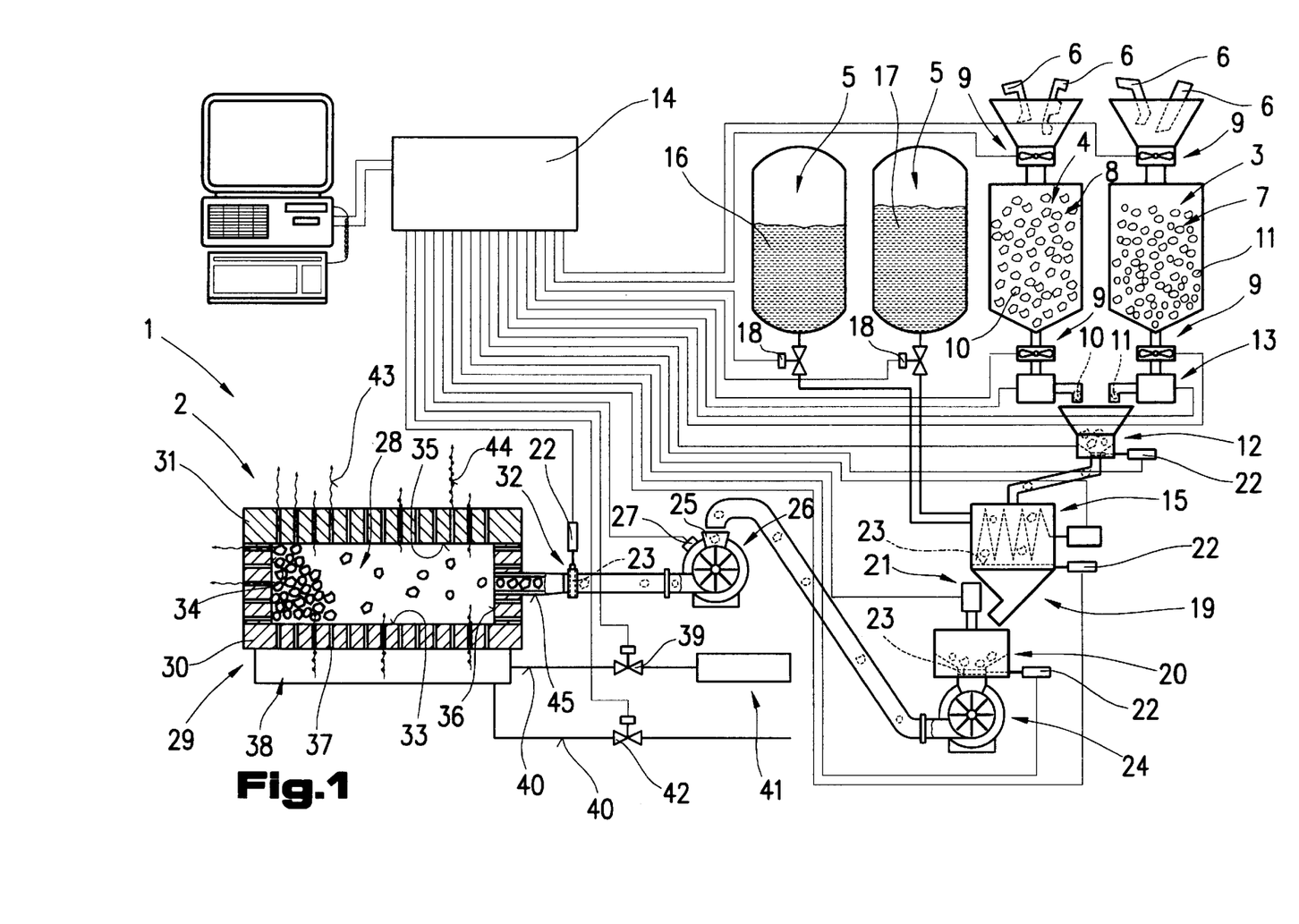
FIG. 1 shows an installation for the production of a shaped part according to the invention, in a simplified, diagrammatic representation.

FIG. 1 shows an installation 1 for the production of shaped parts 2. Said installation comprises several receptacles 3, 4 and a receiving tank 5 for different parts 6 of foamed plastic 7, 8, preferably also waste from foamed plastics for recycling.

The parts 6 contained in the individual receptacles 3, 4 may consist of differently cured plastic foams or plastic foam with or without coatings or covering layers or the like, for example. The materials used can be preferably individual or in any presettable ratios of PUR (polyurethane) soft foam waste materials, PUR cold and/or hot foam mould wastes, PUR-soft foam waste material coated or textile- and/or foil-backed, PUR-composite foam waste material, but also rubber or cork granulates. Here, it is possible that in addition, thermoplastic waste and/or natural and/or synthetic fibres of different length are added to the above mentioned materials in order to produce the shaped parts 2. If waste of foamed plastics is provided, it may originate from production waste, or parts 6 may of course also consist of already used, disassembled parts of synthetic material foams. It is, of course, also possible to reduce plastic foams of primary material, i.e. plastic foams which have been produced particularly for this purpose, to the appropriate granulate size.

It is of course also possible that larger parts are contained in these receptacles 3, 4, as they occur for example when cutting shaped parts, such as paddings, mattresses, noise damping elements or panelling elements used in the car industry, so that these parts of synthetic material or plastic foams 7, 8 which are to be recycling, are torn up, cut or somehow otherwise reduced to a preset granulate size of between 3 mms and 20 mms, preferably 5 mms to 10 mms, before they are stored in the receptacles 3, 4.

Generally, the parts 6 are reduced to the desired granulate or flock size before they are stored in the receptacles 3, 4, by means of reduction devices 9, for example a willowing machine, a cutter or disintegrator, a mill or the like, so that the granules 10, 11 of various plastics or plastic foams 7, 8 are already in the receptacles 3, 4. If, instead of them however, parts 6 in their respective size are in the receptacles 3, 4, a willowing machine, a cutter or disintegrator or the like may be located downstream of these receptacles 3, 4, as schematically indicated. The granules 10, 11 are then transported from the receptacles 3, 4 in a portion corresponding to the respective mixing ratio, for example by means of pneumatic conveyance to a weighing tank 12. The regulation of the amounts of individual flocks 10, 11 can take place by control valves 13, which are monitored and activated by a central control system 14.

The premixed charge of waste or granules 10, 11 of new material or other materials, which, if required, can be arranged in their own additional receptacles 3, 4 which are not shown, is then for example mixed by a pneumatic conveyance of a mixing device 15, for example is supplied to a rotary mixer, in which it is mixed with a liquid raw material 16 or 17 such as a polyalcohol and an isocyanate, which is supplied in quantities regulated by means of control valves 18 depending on the control system 14.

If the raw materials 16, 17 which are supplied by the receiving tanks 5 are suffiently mixed with the granules 10, 11 in the mixing device 15, or the mixture is so good that these flocks 10, 11 are essentially coated continuously over their entire surface with this liquid raw material, the flocks 10, 11 which are coated with the liquid raw material of the synthetic material or foamed plastic, are brought to an intermediate storage tank 20 by means of a conveyor 19, for example with a blower or a spiral conveyor. This intermediate storage tank 20 can be constructed as a weighing tank 12, that is to say, to determine the weight it can be connected with a measuring device, which is generally also connected with the control system 14 downstream of which a weighing device 21 is arranged. The conveyor 19 of the mixing device 15, which for example is indicated only schematically, can consist of a feed screw but also of a gravity conveyance, for example a stopper 23 which is adjustable by means of an adjusting device 22 in the outlet region of the mixing device 15 which feeds the granules 10, 11 which are mixed with the raw material 16, 17 into the intermediate storage tank 20.

In this intermediate storage tank 20, a mixed quantity is preferably filled in, which is enough to produce the greatest shaped part with this installation. But also any multiple of this quantity can be stored in the intermediate storage tank 20.

Depending on the desired weight of the parts by using the corresponding conveyer 19 or the stopper 23 which is adjustable by the adjusting device 22, a quantity of granules 10, 11 mixed with the raw material 16, 17 can be fed from this intermediate storage tank 20 to the weighing device 21 arranged downstream of the intermediate storage tank 20, which is generally 3–15%, preferably of between 5 and 10% above the final weight of the parts of a shaped part to be produced. The supply of the mixture from the intermediate storage tank 20 into the weighing device 21 is also monitored by a schematically indicated measuring device which transfers the data to the control system 14, and the conveyance of the mixture from the intermediate storage tank 20 is interrupted when the predetermined weight is reached.

From the weighing device 21 it is possible to approach the adjustment drive 22, for example by a pneumatic cylinder-piston arrangement or an electric stepping motor or the like via a corresponding control by means of the control system 14 in order to move the stopper 23. Taking into account the reduced weight—which is reduced in the weighing device 21 by conveyance and monitored by the measuring device— of the mixture of granules 10, 11 coated with raw material 16, 17, the conveyance, by means of a conveyer 24 arranged downstream of said weighing device, is continued to such a point until a quantity of the mixture corresponding to the predetermined weight required for the production of the shaped part is removed from the weighing device 21.

The conveyer 24 located downstream which transfers the mixture of granules 10, 11 formed of raw material 16, 17 to a receiving hopper 25 of a conveying blower 26 arranged downstream thereof, can be formed by a spiral conveyer or a blowing conveyer. A drive 27 of the conveying blower 26 is also controlled by the control system 14.

After a further stopper 23 located downstream of the conveying blower 26 and activated by the control system 14, or an adjustment drive 22 connected to the latter has been opened, the mixture of granules 10, 11 and raw material 16, 17 can now be blown into a mold cavity 28 of a mold 29 which consists of a lower mould part 30 and an upper part 31.

The control of the supply of the granules 10, 11 which are coated with the liquid raw material can also take place via a control valve 32, for example a stopper 23, which can also be controlled by a control system 14 in the same manner as the conveying blower 26.

In all or some of the individual mold surfaces 33 to 36, admission openings or ventilation openings 37 can be arranged, at least in the mould surface 36 opposite the inlet-opening, which connects the mold cavity 28 with ambient air, or, as schematically indicated, with an exhaust pipe 38.

Into the exhaust pipe 38 runs a feeder 40 also via a control valve 39, which is activated by the control system 14, by means of which for example water vapour, preferably dry steam at a temperature of 160° C. to 180° C., or another reaction means, for example of a heat exchanger 41 or a steam station is fed into the exhaust pipe 38. This takes place for example in that the exhaust pipe 38 is closed by a stop valve 42, which is activated by the control system 14, whereupon between this stop valve 42 and the mold cavity 28 this reaction means or vapour is introduced by the feeder 40 and after it flowed through the mold cavity 28, can flow out of the ventilation openings 37 which are not closed. Not only the air brought into the mould cavity 28 through these ventilation openings 37 during the introduction of the granules 10, 11—according to the schematically indicated arrows 43-, can be removed but the water vapour, also indicated schematically by an arrow 44, can be introduced into the mould cavity 28 and also removed therefrom.

FIGS. 2 to 6 show the mold 29 in a simplified, diagrammatic representation but proportionally enlarged.

Figure 2:
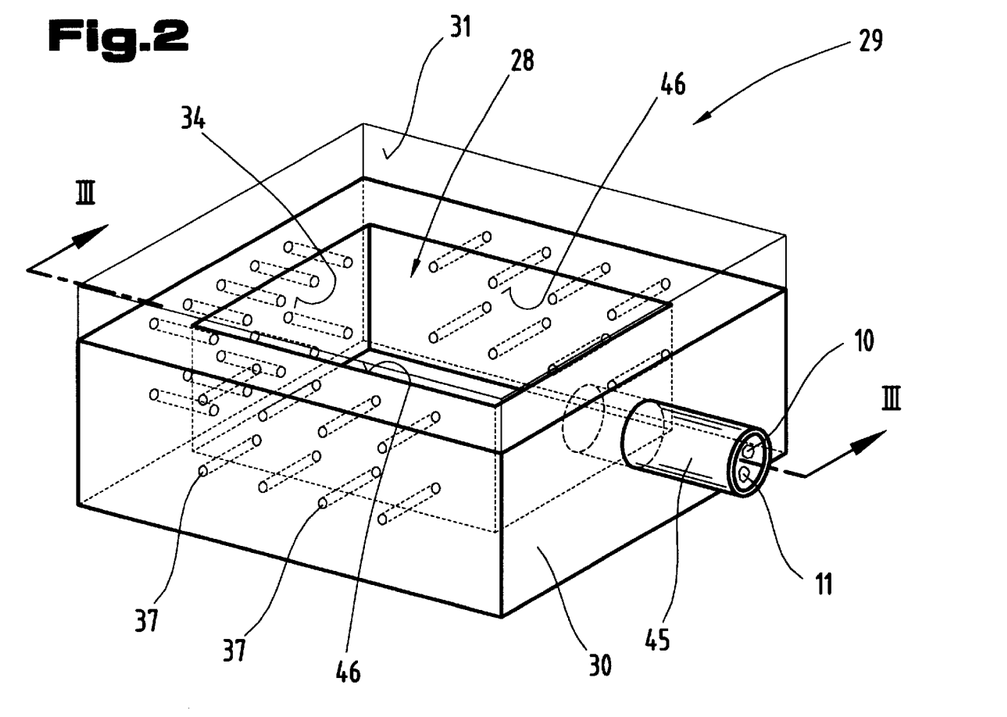
FIG. 2 shows a mold for the production of a shaped part, in a simplified, diagrammatic representation.

Thus, it can be seen from this illustration that the granules 10, 11 can be introduced by a supply line 45 into the mold cavity 28, and in this case, the ventilation openings 37 are arranged on the sidewalls parallel to the region of the mould surfaces 34 and 46, so that the air coming in with the mixture of granules 10, 11 can flow out into the open through these ventilation openings 37 or into the exhaust pipes described by way of example in FIG. 1.

Figure 3:
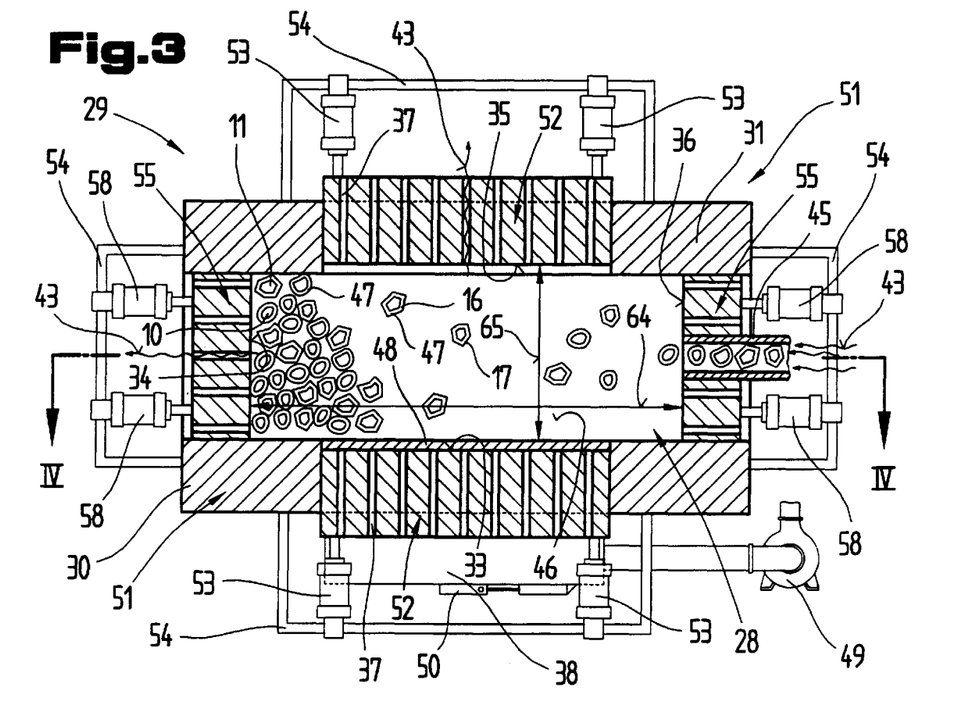
FIG. 3 shows the mold according to FIG. 2, in a front view, in a section taken along the lines III—III in FIG. 2 and in a simplified, diagrammatic representation with a covering layer introduced into the mold and an inner chamber partially filled with granules of synthetic material.

As can be seen better from the representation in FIG. 3, the granules 10, 11 are pulled into the mold cavity 28 by the air flow indicated by the arrows 43, and are deposited therein or on the mold surfaces 34 to 36 and 46, as schematically indicated. It can be seen further from the representation that each of the granules 10, 11 is coated with a surrounding coating 47 of the mixture of raw materials 16, 17 which is still liquid to form the plastic foam.

Generally, between 70 and 90%, preferably 85% of the volume of the shaped part 2 to be produced consists of granules 10, 11 of plastic foam from raw material 16, 17. 10 to 20% of the weight of the shaped part 2 are formed by the plastic foam of primary material or raw material 16, 17. The granules 10, 11 of plastic foam 7, 8 have in general a specific gravity of between 20 kg/m$^3$ and 250 kg/m$^3$, preferably 50 to 150 kg/m$^3$. The specific gravity of the plastic foam which has been produced from raw material 16, 17 is of between 800 kg/m$^3$ and 1200 kg/m$^3$ whereby the latter is preferably half stiff or half hard.

Furthermore, FIG. 3 also shows that before the granules 10, 11 are introduced, for example onto the mold surface 33, i.e. the floor of the mold 29, a covering layer 48, for example a batt or knitted material, fabric, lattice, net of natural or synthetic fibres, can be inserted preferably into a deepened part of the mould surface.

In this case, also when the ventilation openings 37 are triggered separately in the region of the individual mold surfaces 33 to 36 and 46 it is possible to use these ventilation openings 37 by applying a vacuum, for example by means of a vacuum pump 49 and by flaps 50 which can be controlled separately from the control system, in order to hold the covering layer 48 tightly. The vacuum pump 49 which is connected to the exhaust pipe 38 is also shown schematically in FIG. 1.

In particular if the covering layer 48 is permeable to air, a portion of the conveying air can be simultaneously sucked up by the vacuum pump 49 or otherwise, can flow through the remaining ventilation openings 37 according to arrows 43 out of the mould cavity 28.

When the mold cavity 28 is filled with granules 10, 11 in a uniform manner from the back towards the front, the conveying blower 26 is switched off and the supply line 45 is closed by means of the stopper 23, if required, the conveying blower 26 of the mold 29 can be uncoupled, in particular if said mold is arranged on a turntable or on a conveyer for loading of different work stations.

It is essential for the present method or manufacture of the shaped part 2 that the volume of the mold cavity 28 is about 10 to 50%, preferably 20% to 30% larger than the volume of the finished shaped part 2. This general precompression of the shaped part 2 occurs in such a way that the individual mold surfaces 33 to 36 and 46 depending on the various shaped parts 2 to be produced, are displaced into different positions from their initial position, either individually on different individually differing mold surfaces 33 to 36 and 46 or on all of them.

Thereby, the individual mold surfaces 33 to 36 and 46 can consist of several parts. In the present examples of an embodiment in FIGS. 3 to 6 only the mould surfaces 33, 35 and 46 are designed in several parts.

This way, the mold surface 33 consists of a surrounding mold ring 51 and an adjustable central part 52, which, as indicated schematically, can be activated by an adjustment drive 53, for example a pneumatic or hydraulic cylinder, which, as indicated schematically, can be supported by a mold frame 54, by triggering a control system 14 or energy sources activated by the latter, such as compressed-air compressors or hydraulic pumps. The same way, the mold surface 35 consists also of a surrounding mold ring 51 and a central part 52, which can be adjusted in the same way, which is also adjustable via a schematically indicated adjustment drive 53 with respect to the mold ring 51, which in the same way as the mold ring 51 of the mould surface 33 is held in a mold frame 54. The mold surfaces 46, on the other hand, are constructed in one piece and the mold surface 34 is also composed of a central part 55 and two lateral parts 56 and 57, as can be better seen from the representation in FIG. 6, whereby the lateral parts stand permanently in the frame 54 and the central part, as can be seen from FIG. 3, is adjustable with respect to the other elements by means of an adjustment drive 58.

Figure 4:
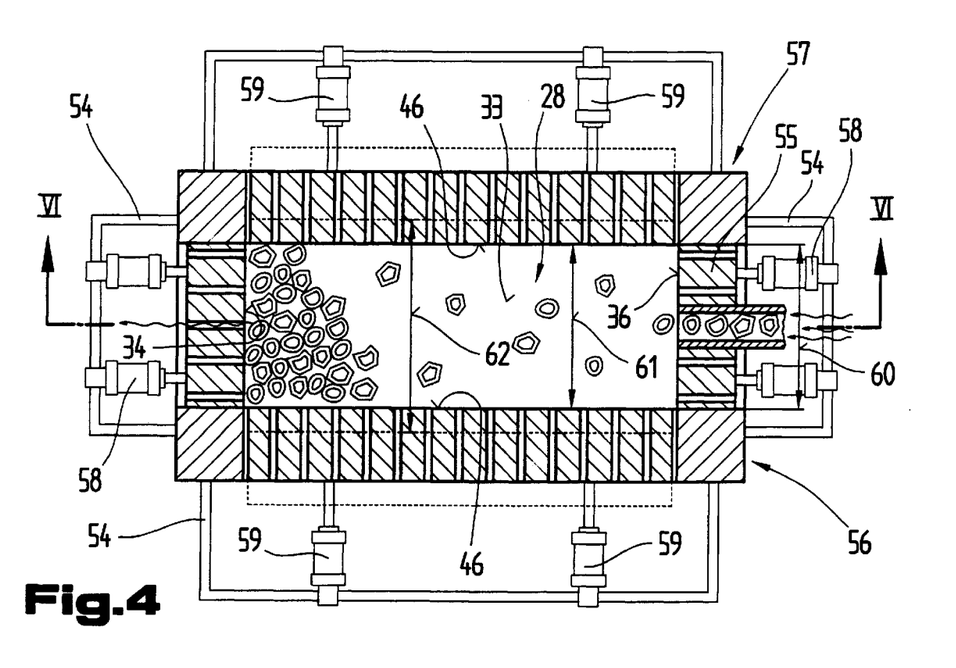
FIG. 4 shows the mold according to FIGS. 2 or 3, with form surfaces adjusted for pre-compression of the shaped part, in side view, in section and in a simplified, diagrammatic representation.
Figure 5:
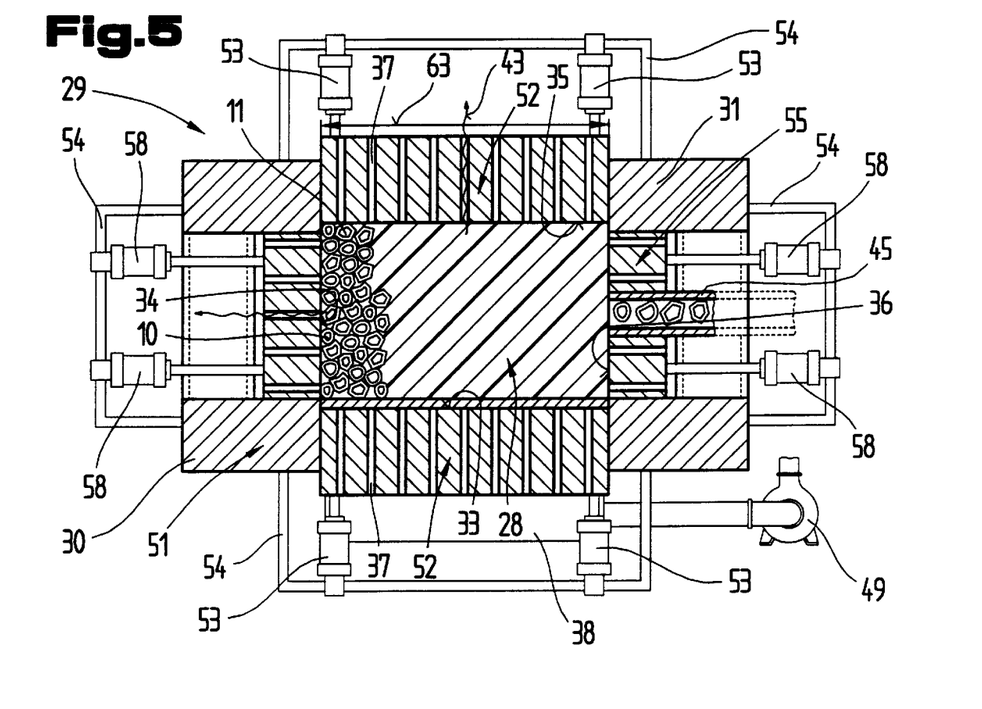
FIG. 5 shows the mold according to FIGS. 2 to 4 with further mold surfaces adjusted for the pre-compression of the shaped part, in front view, in section and in a simplified, diagrammatic representation.

As it is apparent from the course of processes shown in FIGS. 3 to 5, the surfaces 46 with the adjustment drives 59 associated therewith, are displaced from their initial position drawn in FIG. 5 by broken lines, which corresponds to the position in FIG. 3, into the compressed adjustment position, drawn in full lines. A distance 60 between these two rid surfaces 46 which are mutually opposed, corresponds precisely to a width 61 of the central part 52 of the mould surface 33 exactly parallel to the distance 60.

Depending on the ratio between an initial width 62 and the distance 60, a different compression ratio or a different compression of the granules 10, 11 or the granulate which are arranged in the Ed cavity 2 and are still coated with liquid plastic is achieved.

After this compression process, as shown in FIG. 4, the central part 55 of the mould surface 34 is displaced from the position shown by broken lines in FIG. 4 and by full lines in FIG. 3, into a compressed position which is now shown in FIG. 4, by means of the adjustment drive 58. At the same time the mould surface 36 or a central part 55 equivalent to the mold surface 34 can be adjusted after an appropriate decoupling of the supply line 45 from the conveying blower 26, from a position shown in fill lines in FIG. 3. into a compressed position drawn in fill lines in FIG. 4. By the displacement of these central parts 55 relative to the mold surfaces 46, which have been transported together, a length 63 of the shaped part 2 is now reduced to a predetermined length of the central parts 52 of the mold surfaces 33 and 35. Due to the difference between the initial length 64 of the mold cavity 28 between the mould surfaces 34 and 36 and the finished length 63 a further compression factor of the shaped part 2 is also established.

Figure 6:
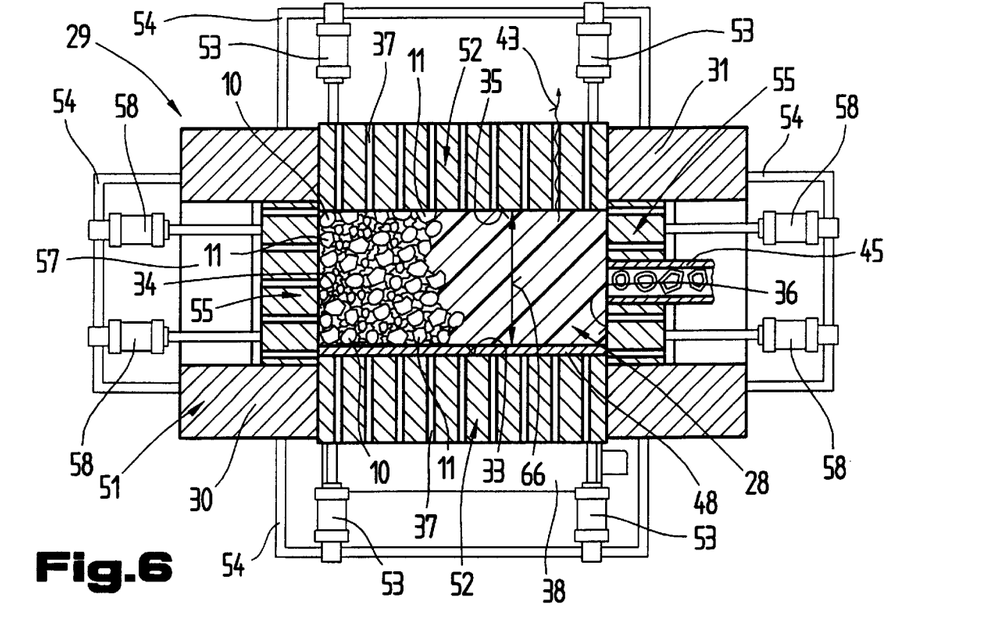
FIG. 6 shows the final pre-compressed shaped part in the mold according to FIGS. 2 to 5 and after reaction of the liquid synthetic material in a simplified, diagrammatic representation.

Finally, as can be seen from FIG. 6, the further compression of the nonsolidified shaped body, i.e. of the granules 10, 11 which can still be moved relatively towards each other with their coating 47, can achieve an initial height 65 of the mold cavity 28 to a height 66 by transporting together the central parts 52 of the mould surfaces 33 and 35.

With this final adjustment process the article-specific compaction process is terminated. The original volume is reduced by these supply or adjustment steps of the individual mold surface parts or the central parts 52, 55 and the mold surfaces 46 for the desired percentage of about 10 to 50%.

Thereby, it is to be noted that an average weight of the shaped parts 2 is between 20 kg and 300 kg. The adjustment occurs by means of adjustment drives, which can be constituted by hydraulic or pneumatic cylinders as described hereabove. The sequence of the displacement of the individual mould surfaces or mould surface parts, such as the central parts 52 or 55 and the mould surfaces 46, have been explained only by way of example in FIGS. 3 to 6. The successive movements of the individual mold surfaces or their central parts or other shaped parts, can be set differently depending on the article or the final hardness achieved or the like in each single shaped part 2. It is also possible that the lifting or adjustment paths of the individual mould surfaces or mold surface parts or the central parts of the latter, can take place at different sizes so that in different three-dimensional directions of the shaped part 2 different compression values can be achieved, for example through compressions in vertical direction only 15% of the volume and by compression in the longitudinal direction of the component 30% of the volume or by compression in the direction of the width a reduction in volume of about 35%.

After this article-specific precompression, the covering layer 48, which extended initially only over a portion of the initial length 64 and the initial width 62 of the mold surface 33 for example, covers now a surface of the shaped part 2 over its entire face as can be seen from FIG. 6.

Thereafter, as already described schematically in FIG. 1, the reaction fluid, for example vapour with a temperature of 160° C. to 180° C., in particular dry steam is fed into the mold cavity 28 through ventilation openings 37 or openings which are arranged especially for this purpose. These reaction fluids, in particular vapour or a solvent introduces the reaction of the liquid coating 47 or the synthetic material, and this liquid raw material foams up due to an appropriate gas formation and the development of a cell structure of open and/or half open and/or closed cells between the individual granules 10, 11 for example, as indicated schematically in FIG. 6.

This way, the initially loose granules 10, 11 are integrated into a soft, medium or hard cell structure depending on the desired strength based on the raw material used, and this leads to a strenghtened shaped part 2 having the desired thickness and hardness.

After the reaction of the coating 47 and the development of a corresponding cell structure in the shaped part 2, the mold 29 can be conveyed to a drying station, especially if the mold is moved along a mold path in cycles, for example by means of a turntable, whereby hot, dry air is guided through the ventilation openings 37 for example, in order to dry the shaped part after its reaction.

After the shaped part 2 has been sufficiently dried, the corresponding supply openings for this dry air are closed and the mould 29 can be opened and the shaped part 2 can be removed.

Of course, within the scope of the present invention it is also possible to carry out the individual working steps manually, half or fully automatic or to control these steps semi-automatically or automatically by means of an overall control system using a control system 14.

Instead of the mold surfaces 33 to 36 and 46 which consist of several parts, mold surfaces with a plurality of individual mold punches can be used for example in order to achieve a rapid adaptation of the mold for the production of different shaped parts. The surface or the mold cavity 28 as well as the subsequent individual compression processes can be preprogrammed for the production of the respective articles in an all-automatic manner by an appropriate control programme.

Hence, it is furthermore also possible that the central parts 52 of the mold surfaces 33 or 35 can be provided with any three-dimensional shape on a surface facing towards the mold cavity 28. If this is not favourable for precompression, it is also possible to use first a plane-surfaced central part 52 to precompress the granules 10, 11 and to replace it by a central part 52 with a particular three-dimensional shape before the reaction process or the reaction of the coating 47 or the synthetic material starts, in order to give the shaped part 2 a required spatial deformation during the production process. The short opening and closing can also be used to apply covering layers directly to one or several surfaces of the shaped part 2, as it is indicated schematically by way of example of the covering layer 48 covering layers directly onto the shaped part 2 during the production process on one or several of the surfaces of the shaped part 2, as it is indicated schematically by means of the covering layer 48.

Depending on the raw material 16, 17 to be used which in general is a polyurethane, polyether or polyester foam, which can be adjusted to be soft, medium or hard, a close or open cell structure is formed in which the individual granules 10, 11 are embedded thereafter.

The advantage of this solution lies in particular in the fact that due to the supply of the granules 10, 11 by the air stream into a closed mold cavity 28 based on the regular flowing away of the air, a uniform complete filling of the mold cavity 28 is achieved whereby a tighter packing together of the granules 10, 11 which are elastic and can be deformed under weight load, is eliminated. Since the granules are keeping their balance during the filling of the mold cavity 28 due to the air stream which is constantly passing through, according to arrows 43, and after the air stream is switched off, due to the raw material of the coating 47 adhere loosely to one another, a production of shaped parts 2 is created also during a series production with a high repetition phase sequence number, which, over its entire cross-section allows for an average specific gravity and uniform distribution of the granules 10, 11, in particular also of the various recycling materials with different specific gravities or coating parts.

Based on the preceeding mixture of the granules 10, 11 from the receptacles 3, 4 and the filling weight of the mould cavity 28, which can be predetermined in the intermediate storage tank 20, the basic density being achieved can also be preselected, whereby, if required, it can be additionally influenced by the air stream or the air pressure procuded in the mold cavity 28 by the air stream.When the filling with the granules 10, 11 in the mold cavity 28 increases, the pressure produces a greater resistance against the air flowing through, and depending on the preselected degree of pressure of the conveying air, an equivalent density can be created in the granules 10, 11 which are located loosely in the mould cavity 28, or in the preformed blank part.

Figure 7:
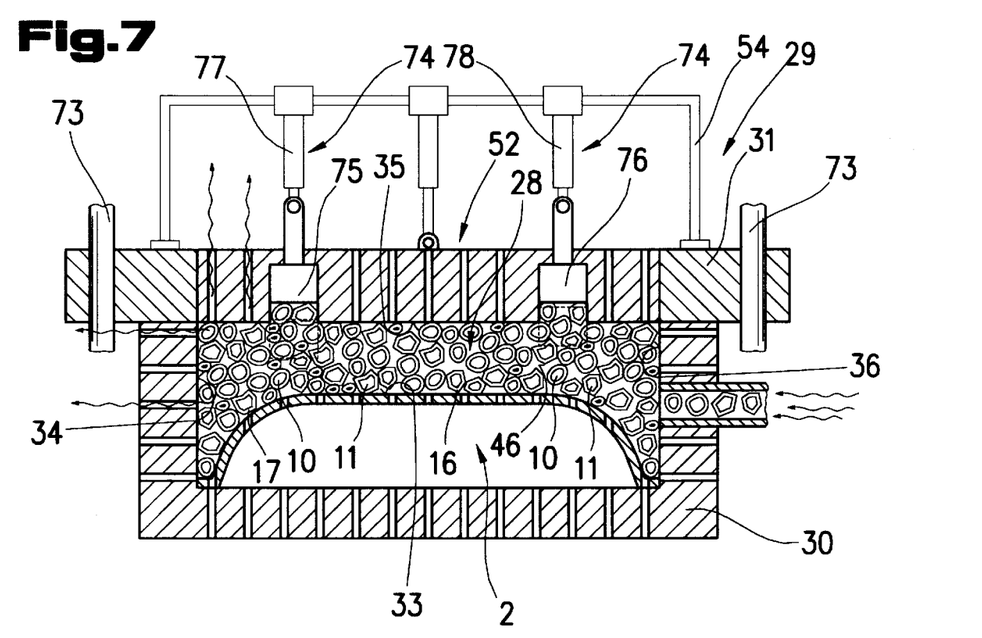
FIG. 7 shows another embodiment of a mold for a shaped part according to the invention, in side view, in section and in a simplified, diagrammatic representation.
Figure 8:
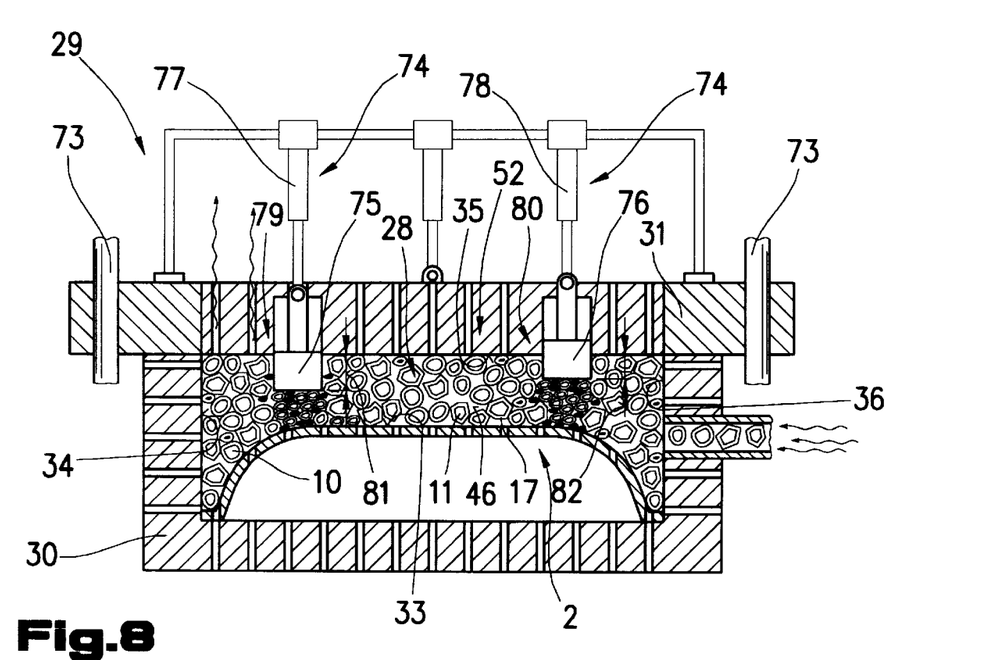
FIG. 8 shows the mold according to FIG. 7 with granules of foamed plastic compressed to a different degree in different areas.
Figure 9:
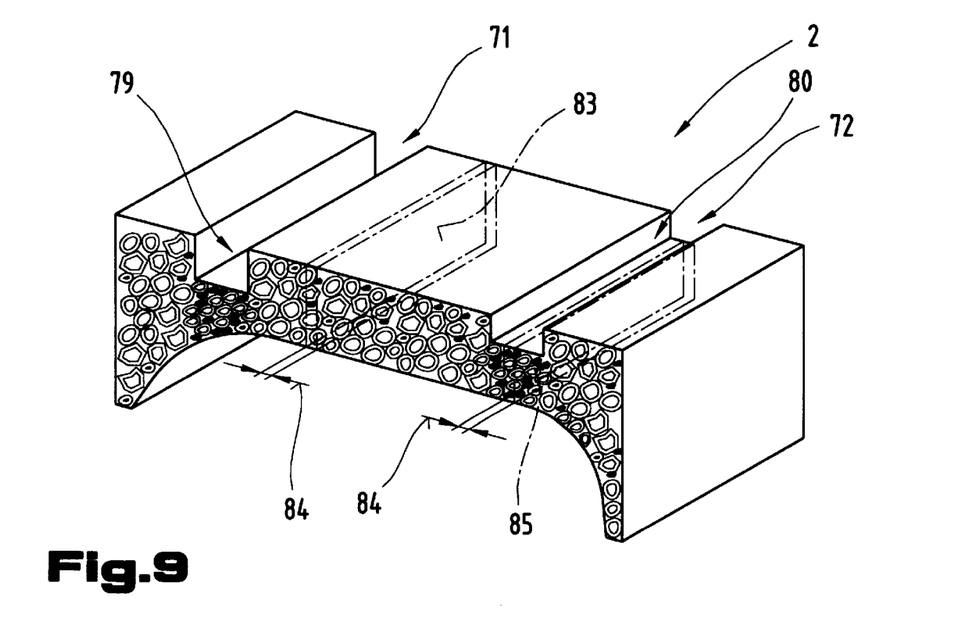
FIG. 9 shows a shaped part in accordance with the invention according to FIGS. 7 and 8 in a cross-sectional perspective view.

In addition, FIGS. 7 to 9 show that the mold cavity 28 can also be used to produce spatially curved shaped parts 2 as it is shown for example in FIG. 9.

As can be seen further from the representation of the shaped part 2 in FIG. 9, the latter can also be provided with deepened recesses 71, 72.

As illustrated in the molds used, it is now simultaneously possible by means of a general precompression of the shaped part 2 based on the displacement of a central part 52 of the mold surface 35, to increase the density in the shaped part in the cross-sectional regions in which the recesses 71, 72 are arranged in the shaped part 2.

This occurs in such a way that in the mold surface 35, for example along guide rods 73 by means of adjustment drives 74, for example piston-cylinder arrangements activated by a fluid for example, adjustable mold inserts 75, 76, which by means of setting drives 77, 78 shown in full lines in FIG. 7 are displaceable into a position shown in full lines in FIG. 8.

This way, as can be seen from the different density of the schematically indicated granules 10, 11 in FIGS. 7 and 8, the mold cavity 28 is enlarged whilst the granules 10, 11 which are coated with the raw material 16, 17 are blown in and in the entire mold cavity a filling with identical density is achieved.

In order to achieve in the regions 79, 80 of the shaped part 2 a higher density of the granules 10, 11 and also of the foam structure of raw material 16, 17 situated therebetween, in addition to the general precompression of the granules 10, 11 as it is achieved by the adjustment of the central part 52 of the mold surface 35 by means of the adjustment drive 53, or independently thereof, the mold insert 75 and/or 76 can be adjusted by means of setting drives 77, 78 from a rest position or filling position for the mould cavity 28 drawn in full lines in FIG. 7 into the compression position shown in FIG. 7 by broken lines and drawn in FIG. 8 in full lines.

As it is indicated schematically in FIG. 8 by a tighter layer of the granules 10, 11, the density is thereby increased in the regions 79, 80 of the mold cavity 28 corresponding to the respective insertion depth 81 or 82 which, during the subsequent reaction of the liquid raw material 16, 17 based on the higher density results in an increasingly strenghtened zone in the shaped part 2.

This has for example the advantage, that in this region, fastening elements can be arranged by means of which the shaped part 2, when used as noise insulating mat or inner lining in a vehicle, can be fixed to the body.

The compression can also be arranged to provide the shaped part 2 in its entirety based on the forming with a higher stiffness or strength.

It is, of course also possible, if in this region, in which the recesses 71 and 72 are provided, no greater density of the shaped part 2 is required, that the mold inserts 75, 76 can already be displaced before the granules 10, 11 are blow in, into a position shown by broken lines in FIG. 7. This leads to the development of a shaped part 2 in which recesses 71, 72 are arranged but this shaped part 2 has then over its entire cross-section an average identical density.

The average, identical density can be found or compared as follows:

The weight of a cross-sectional piece 83—as shown in FIG. 9—is determined by a thickness 84 and calculated from the volume and the existing weight, which volume this cross-sectional piece 83 would have at a predefined reference specific gravity.

Thereafter, the weight of a further cross-sectional piece 85 having preferably the same thickness 84 is determined, and also from the resulting data, the volume is established for the reference specific gravity used for calculation. The values of volumes, which have been established in this way, refer to an identical reference specific gravity, which is then referred back to a given reference volume, and an identical average density and/or specific gravity is provided if the resulting specific gravity of the reference volume or the density is the same, or not deviating more than+/−15%, preferably+/−7, 5% from one another.

Thereby, it is understood that a comparison of specific gravities refers to the ratios as they occur during the blowing in of the granules 10, 11 into the mould cavity 28, whereby a larger volume of the mold cavity 28 is created by pulling back the mold inserts 75, 76 or the mold surfaces 33 to 36 and 46, which is filled with granules 10, 11 of identical density.

The higher compression schematically indicated and shown in FIG. 6 in the regions 79 and 80 of the shaped part 2 is only achieved in that the initially introduced granules 10, 11 with identical density are partially more compacted by a deliberate volume reduction which of course, also increases the specific gravity removal of due to the reduced volume. Of course, in this variant of an embodiment, it is also possible not only in the direction of the mould surface 35, but also in the direction of the other mold surfaces 33, 34, 36 and 46 to carry out a precompression. The same way, it is also possible to arrange additional adjustable mold inserts 75 and 76 of any type and configuration, also in the other mold surfaces 33, 34 or 36 and 46.

For good order's sake it must be noted at this point, that each of the examples of an embodiment shown or feature combinations characterized in the claims can form their own solution in accordance with the invention. In addition, individual features of the individual examples of an embodiment which are combined with one another in any composition, can also form the object of own solutions according to the invention.

For a better understanding of the effect of the method and the structure of the shaped part 2, individual layers and coatings of the granules 10, 11, the granules themselves or the shaped part 2 is unproportionally enlarged and distorted or greatly exaggerated. The same applies also for devices and molds for the production of such shaped parts, which are mostly shown in a simplified and diagrammatic representation.

As molding material for the molds 29, metal alloys especially of epoxy resin or resin-fed, such as molds cast of aluminium, milled out or in the form by aluminum plates, as well as of stainless steel or iron plates, can be used for the production of the moulds.

Finally, it must be pointed out that an advantage during the production of the shaped parts 2 of recycling material is achieved by the above described way of processing, in that the old recycling materials at the time when the hardening or reaction of the raw material 16, 17 occurs by means of a hot vapor or hot air, which, can also be soiled, are sterilized by the high temperatures and thereby eliminate any undesired fungus, germs or the like.

In particular, the individual embodiments shown in FIGS. 1; 2–6; 7, 8; 9 can form the object of own solutions according to the invention. Relating tasks and solutions are apparent from the detailed descriptions of these figures.

What is claimed is:

1. A method of producing a three-dimensional shaped plastic foam part, comprising the steps of (a) mixing plastic foam granules having at least one property selected from the group consisting of a predetermined range of sizes and different hardness in a predetermined mixing ratio to obtain a mixture of the plastic foam granules, mixing the mixture of the plastic foam granules with a liquid primary material until the granules are coated with the liquid primary material and a mixture of coated plastic foam granules is obtained, (b) storing the mixture of the coated plastic foam granules in an intermediate storage tank, (c) conveying a preset quantity of the stored coated plastic foam granules from the intermediate storage tank to a mold cavity of a mold closed on all sides,
      (1) the stored coated plastic foam granules having been weighed to provide a quantity thereof which is between 3% and 15% above the quantity required to fill the mold cavity, and
      (2) the weight of the stored coated plastic foam granules having been so controlled that it corresponds exactly to that of the quantity to fill the mold, (d) reducing the volume of the mold cavity at least in partial regions thereof after it has been filled with the mixture of coated plastic foam granules, (e) triggering a reaction of the liquid primary material by applying pressure and heat until a continuous cellular structure of plastic foam has been formed and the plastic foam granules have been interconnected by the cellular structure of plastic foam after the volume of the mold cavity has been reduced at least in partial regions thereof, (f) venting gaseous reaction media from the mold cavity through openings in the sides of the mold, and (g) removing the three-dimensional shaped part from the mold cavity.

2. The method of claim 1, wherein the plastic foam granules are made of recycled plastic foam.

3. The method of claim 1, wherein filling materials are added to the mixture of plastic foam granules.

4. The method of claim 1, wherein the reaction of the liquid primary material is triggered by applying water vapor under pressure to cure the liquid primary material.

5. The method of claim 1, wherein the stored coated plastic foam granules are weighed to hold the quantity thereof to no more than between 5% and 10% of the quantity to fill the mold cavity.

6. The method of claim 1, wherein the weighed quantity of the stored coated plastic foam granules is conveyed to the mold by a conveying gas blowing the weighed quantity into the mold cavity.

7. The method of claim 6, wherein the conveying gas is permitted to be vented through the openings in the sides of the mold.

8. A method of producing a three-dimensional shaped plastic foam part, comprising the steps of
   (a) reducing plastic foam to granules of a predetermined range of sizes,
   (b) mixing the plastic foam granules in a predetermined range of sizes in a predetermined mixing ratio to obtain a mixture of the plastic foam granules,
      (1) the mixture of the plastic foam granules having been weighed to obtain the predetermined mixing ratio,
   (c) conveying the weighed mixture of the plastic foam granules to a mixing device to mix the granules with a liquid primary material until the granules are coated with the liquid primary material and a mixture of coated plastic foam granules is obtained,
   (d) supplying a controlled quantity of the coated plastic foam granules to an intermediate storage tank to obtain a preset quantity of the mixture of coated plastic foam granules,
   (e) conveying the preset quantity of the mixture of coated plastic foam granules to an inlet of a conveying blower and blowing the mixture into a mold cavity of a mold closed on all sides,
   (f) reducing the volume of the mold cavity at least in partial regions thereof after it has been filled with the mixture of coated plastic foam granules,
   (g) triggering a reaction of the liquid primary material by applying pressure and heat until a continuous cellular structure of plastic foam has been formed and the plastic foam granules have been interconnected by the cellular structure of plastic foam after the volume of the mold cavity has been reduced at least in partial regions thereof,
   (h) venting gaseous reaction media from the mold cavity through openings in the sides of the mold, and
   (i) removing the three-dimensional shaped part from the mold cavity.

9. The method of claim 8, wherein a larger quantity of the mixture of coated plastic foam granules is fed into the partial regions of reduced volume than into the other regions of the mold cavity.

10. The method of claim 8, wherein the mixture of coated plastic foam granules is fed into the mold cavity through the openings by a conveying gas.

11. The method of claim 10, wherein the conveying gas is vapor.

12. A method of producing a three-dimensional shaped plastic foam part comprising the steps of
   (a) mixing plastic foam granules having at least one property selected from the group consisting of a predetermined range of sizes and different hardness in a predetermined mixing ratio to obtain a mixture of the plastic foam granules, mixing the mixture of the plastic foam granules with a liquid primary material until the granules are coated with the liquid primary material and a mixture of coated plastic foam granules is obtained,
   (b) feeding a preset quantity of the mixture of coated plastic foam granules into a mold cavity of a mold closed on all sides,
   (c) introducing reinforcement elements in the mold cavity before the mixture of coated plastic foam granules has been fed into the mold cavity, and positioning the reinforcement elements in the mold cavity by holding parts,
   (d) reducing the volume of the mold cavity at least in partial regions thereof after it has been filled with the mixture of coated plastic foam granules,
   (e) triggering a reaction of the liquid primary material by applying pressure and heat until a continuous cellular structure of plastic foam has been formed and the plastic foam granules have been interconnected by the cellular structure of plastic foam after the volume of the mold cavity has been reduced at least in partial regions thereof,
   (f) removing the holding parts from the mold cavity before the reaction of the liquid primary material has been completed,
   (g) venting gaseous reaction media from the mold cavity through openings in the sides of the mold, and
   (h) removing the three-dimensional shaped part from the mold cavity.

* * * * *

UNITED STATES PATENT AND TRADEMARK OFFICE
CERTIFICATE OF CORRECTION

PATENT NO. : 6,042,764
DATED : March 28, 2000
INVENTOR(S) : EDER ET AL

It is certified that error appears in the above-identified patent and that said Letters Patent is hereby corrected as shown below:

On the title page, item [73], please change "Australia" to --Austria--.

Signed and Sealed this

Twenty-seventh Day of February, 2001

*Attest:*

NICHOLAS P. GODICI

*Attesting Officer*   Acting Director of the United States Patent and Trademark Office